(12) United States Patent
Wessels, Jr. et al.

(10) Patent No.: US 9,076,568 B2
(45) Date of Patent: Jul. 7, 2015

(54) CONDUCTIVE ELEMENTS IN CABLE JACKETS AND SEPARATORS

(71) Applicant: CommScope, Inc. of North Carolina, Hickory, NC (US)

(72) Inventors: Robert A. Wessels, Jr., Hickory, NC (US); Trent M. Hayes, Hickory, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 14/305,389

(22) Filed: Jun. 16, 2014

(65) Prior Publication Data

US 2014/0291020 A1    Oct. 2, 2014

Related U.S. Application Data

(62) Division of application No. 13/215,677, filed on Aug. 23, 2011, now Pat. No. 8,798,419.

(60) Provisional application No. 61/376,031, filed on Aug. 23, 2010.

(51) Int. Cl.
*G02B 6/44* (2006.01)
*H01R 9/05* (2006.01)
(Continued)

(52) U.S. Cl.
CPC ............... *H01B 7/02* (2013.01); *H02G 15/013* (2013.01); *H02G 15/06* (2013.01); *H01B 7/295* (2013.01); *H01B 11/06* (2013.01); *H01R 9/0518* (2013.01); *H01B 11/04* (2013.01); *H01B 9/003* (2013.01); *H01R 13/5205* (2013.01); *H01R 9/032* (2013.01); *G02B 6/4416* (2013.01); *G02B 6/4469* (2013.01); *H01B 7/32* (2013.01); *H01B 11/02* (2013.01); *G02B 6/4429* (2013.01);
(Continued)

(58) Field of Classification Search
CPC .. G02B 6/4433; G02B 6/4494; G02B 6/4432; G02B 6/443; G02B 6/4429; H02G 15/013; H02G 15/06; H01R 13/5205; H01R 9/0518; H01R 9/032; H01B 11/04; H01B 11/06; H01B 11/02; H01B 7/295; H01B 9/003
USPC .......................................................... 385/113
See application file for complete search history.

(56) References Cited

U.S. PATENT DOCUMENTS 5,149,915 A    9/1992  Brunker et al.
5,789,711 A    8/1998  Gaeris et al.
(Continued)

FOREIGN PATENT DOCUMENTS

CN    2739771 Y    11/2005
CN    1983980 A    6/2007
(Continued)

*Primary Examiner* — Jerry Blevins
(74) *Attorney, Agent, or Firm* — Muncy, Geissler, Olds & Lowe, P.C.

(57) ABSTRACT

A cable, of the twisted pair or fiber optic type, includes conductors for permitting patch cord tracing between ports. In the case of a twisted pair cable, the conductors may be embedded within, or attached to a surface of, a separator. Alternatively, in the case of a twisted pair cable, the conductors may be embedded within, or attached to a surface of, a jacket. In the case of a fiber optic cable, the conductors may be located amongst strength members. Alternatively, in the case of a fiber optic cable, the conductors may be embedded within, or attached to a surface of, a jacket.

18 Claims, 9 Drawing Sheets

(51) Int. Cl.

| | |
|---|---|
| *H02G 15/013* | (2006.01) |
| *H02G 15/04* | (2006.01) |
| *H01B 11/02* | (2006.01) |
| *H01B 7/00* | (2006.01) |
| *H01B 7/02* | (2006.01) |
| *H01B 7/32* | (2006.01) |
| *H01B 11/12* | (2006.01) |
| *H02G 15/06* | (2006.01) |
| *H01B 7/295* | (2006.01) |
| *H01B 11/06* | (2006.01) |
| *H01B 11/04* | (2006.01) |
| *H01B 9/00* | (2006.01) |
| *H01R 13/52* | (2006.01) |
| *H01R 9/03* | (2006.01) |

(52) U.S. Cl.
CPC .............. *G02B6/443* (2013.01); *G02B 6/4432* (2013.01); *G02B 6/4433* (2013.01); *G02B 6/4494* (2013.01); *H01B 11/125* (2013.01)

(56) References Cited

U.S. PATENT DOCUMENTS

| | | | |
|---|---|---|---|
| 5,913,003 | A | 6/1999 | Arroyo et al. |
| 6,292,611 | B1 | 9/2001 | Chamberlain et al. |
| 6,596,944 | B1 | 7/2003 | Clark et al. |
| 6,687,437 | B1 | 2/2004 | Starnes et al. |
| 2003/0105598 | A1 | 6/2003 | Orton |
| 2007/0102188 | A1 | 5/2007 | Glew |
| 2007/0209823 | A1* | 9/2007 | Vexler et al. .............. 174/113 C |
| 2009/0272571 | A1 | 11/2009 | Gromko et al. |
| 2011/0043333 | A1 | 2/2011 | German |
| 2011/0043371 | A1 | 2/2011 | German et al. |
| 2011/0097925 | A1 | 4/2011 | Caveney et al. |

FOREIGN PATENT DOCUMENTS

| | | |
|---|---|---|
| CN | 201556468 U | 8/2010 |
| WO | WO 00/08656 A1 | 2/2000 |
| WO | WO 2008/048955 A2 | 4/2008 |
| WO | WO 2009/052381 A2 | 4/2009 |

* cited by examiner

CONDUCTIVE ELEMENTS IN CABLE JACKETS AND SEPARATORS

This application is a divisional of U.S. application Ser. No. 13/215,677 filed Aug. 23, 2011, which claims the benefit of U.S. Provisional Application No. 61/376,031, filed Aug. 23, 2010, the contents of each application are herein incorporated by reference.

BACKGROUND OF THE INVENTION

1. Field of the Invention

The present invention relates to twisted pair cables having conductive elements within or attached to a separator or a jacket wall. More particularly, the present invention relates to communications patching systems, equipment and methods for automatically tracking connections in communications networks, wherein the conductive elements within or attached to the separator or jacket wall are used to achieve the tracking between ports of a patch panel.

2. Description of the Related Art

The present application relates to the Assignee's prior applications, Ser. No. 12/545,096, filed Aug. 21, 2009, and Ser. No. 12/787,486, filed May 26, 2010, each of which is incorporated herein by reference. With reference to FIGS. 1 and 2, a brief description of the basic system found in the two above applications follows. The basic system described in prior application Ser. Nos. 12/545,096 and 12/787,486 provides a background understanding of the present invention, but should not be considered admitted prior art.

In the basic system shown in FIG. 1, a patch panel 700 has a first row 720 of ports and a second row 730 of ports. A third row 600 of electrical contact pads is interposed between the first and second rows 720 and 730 of ports. Electrical pads 621 and 622 correspond to upper port 721 and electrical pads 621' and 622' correspond to lower port 731.

FIG. 2 illustrates a patch cord 400 in accordance with the background art. The patch cord 400 includes a first plug 420 at a first end of the patch cord 400 and a second plug 420' at a second end of the patch cord 400. The first plug 420 includes first and second electrical contact pins X and Y. The second plug 420' includes third and fourth electrical contact pins X' and Y'. The first pin X of the first plug 420 is electrically connected to the third pin X' of the second plug 420' via a first electrically conductive wire 409. The second pin Y of the first plug 420 is electrically connected to the fourth pin Y' of the second plug 420' via a second electrically conductive wire 410.

When the first plug 420 is inserted into the upper port 721, the first and second pins X and Y make electrical contact with the electrical pads 621 and 622, respectively. When the second plug 420' is inserted in to the lower port 731, the third and fourth pins X' and Y' make electrical contact with the electrical pads 622' and 621', respectively. The electrical circuits formed by the pins X, Y, X', Y' and the pads 621, 622, 621', 622' are used to determine the interconnection made by the patch cord 400, such that a mapping of the patch cords, as connected to the various ports of the patch panels, can be facilitated. In particular, a signal of approximately 10 KHz is transmitted through the formed electrical circuit and used by the mapping system to determine the port-to-port connections. The mapping system is more fully described in the above-two, incorporated-by-reference applications by the present Assignee.

SUMMARY OF THE INVENTION

The Applicants have appreciated drawbacks with the related art. The internal construction of the patch cord 400 is best seen in the partial cut-away view in the middle of the patch cord 400 in FIG. 2. The first and second wires 409 and 410 are intermixed amongst the twisted pairs and separator within the jacket 418 of the patch cord 400. Hence, the first and second wires 409 and 410 cause the cable size (e.g., diameter) to be increased.

It is an object of the present invention to address one or more drawbacks associated with the related art.

These and other objects are accomplished by a cable, of the twisted pair or fiber optic type, which includes conductors for permitting patch cord tracing between ports. In the case of a twisted pair cable, the conductors may be embedded within, or attached to a surface of, a separator. Alternatively, in the case of a twisted pair cable, the conductors may be embedded within, or attached to a surface of, a jacket. In the case of a fiber optic cable, the conductors may be located amongst strength members. Alternatively, in the case of a fiber optic cable, the conductors may be embedded within, or attached to a surface of, a jacket.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
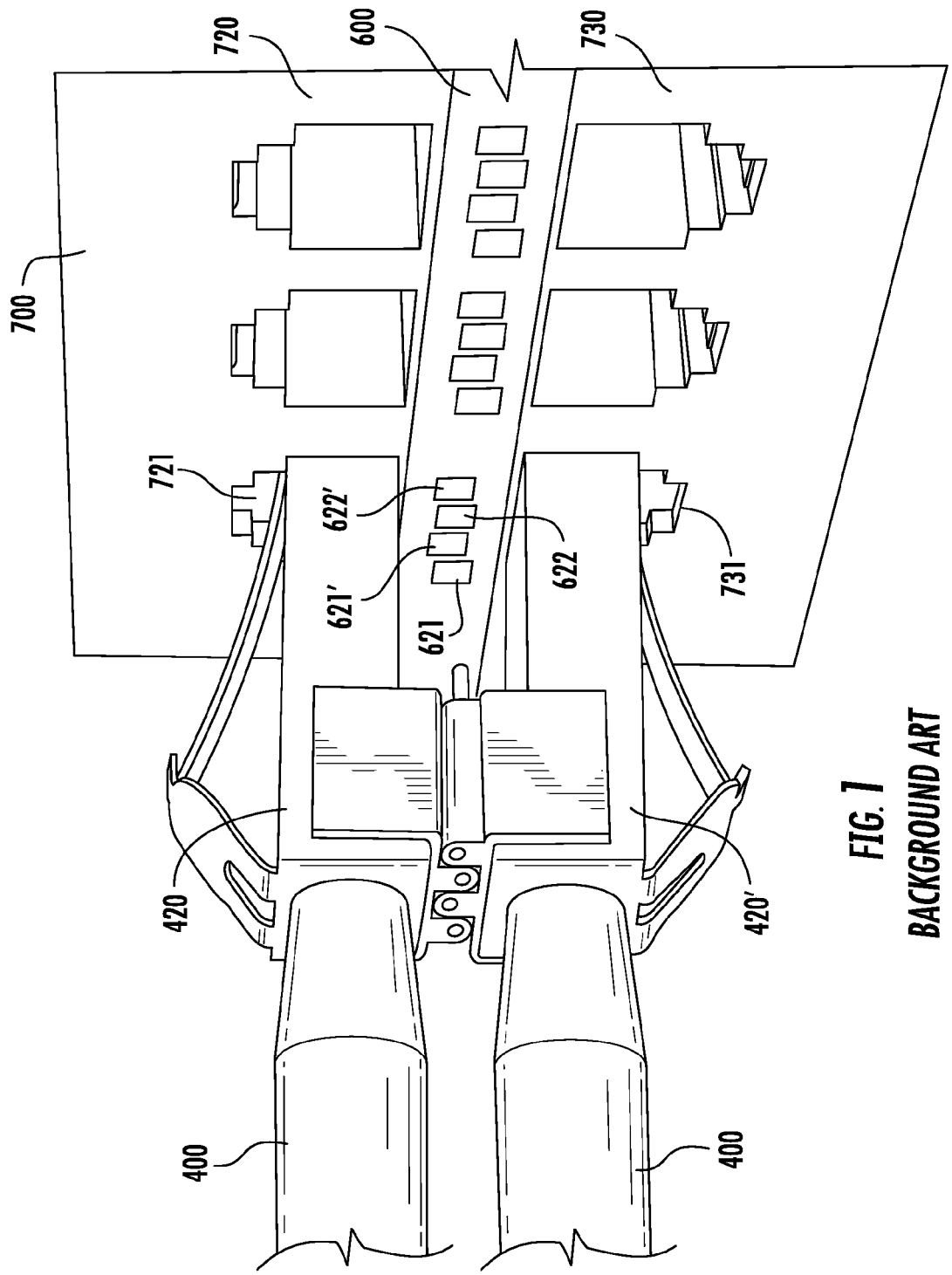
FIG. 1 is a perspective view of a section of a patch panel with plugs aligned for mating within ports of the patch panel, in accordance with the background art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
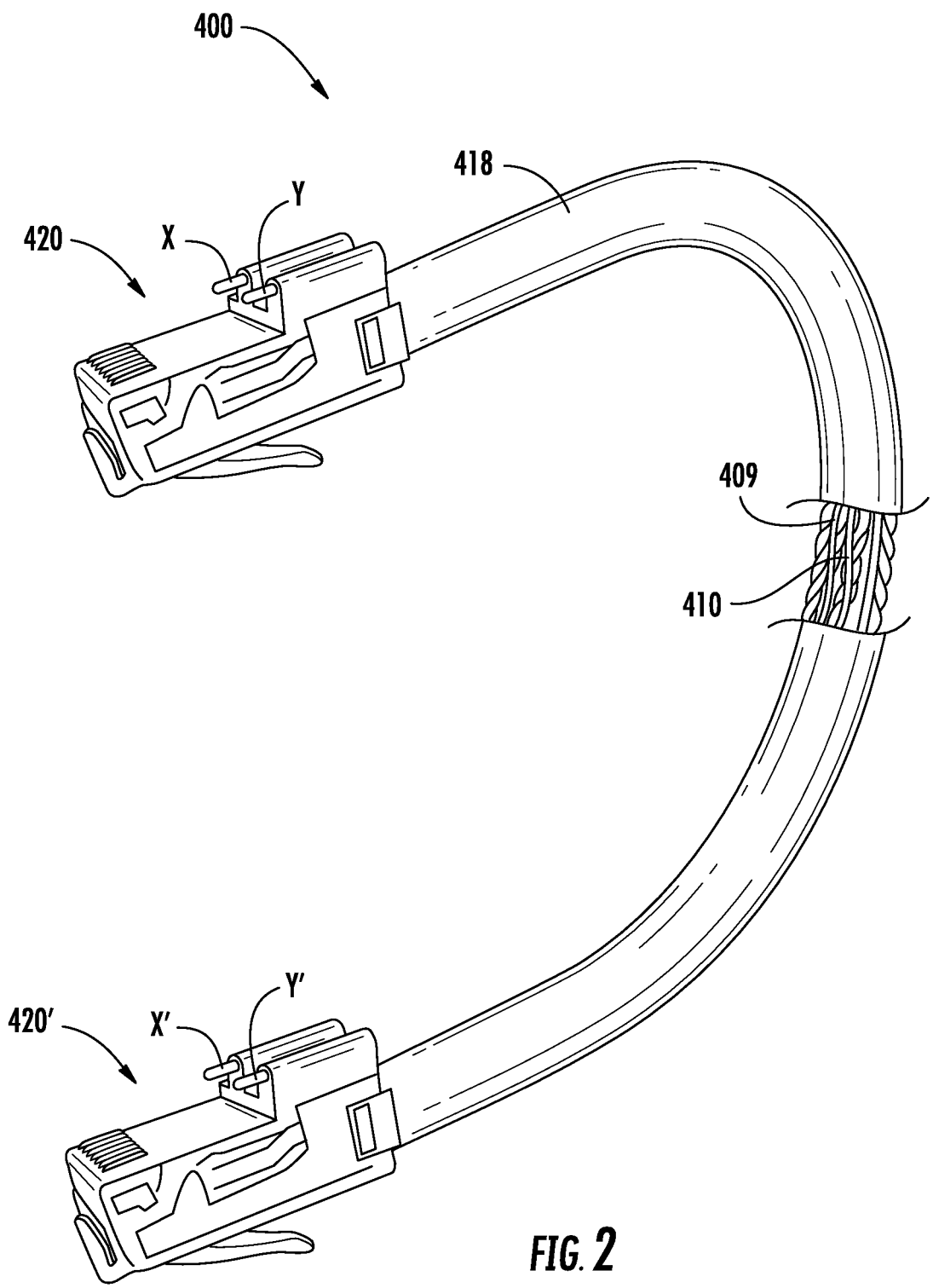
FIG. 2 is a perspective view of a patch cord having the plugs of FIG. 1, in accordance with the background art.
Figure 3:
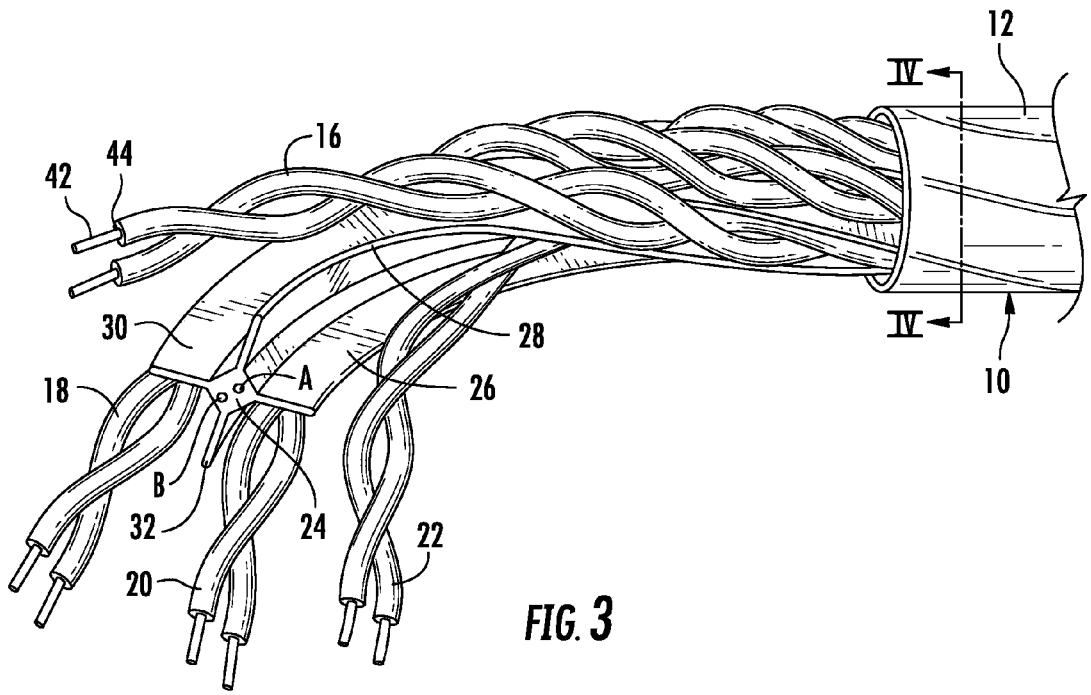
FIG. 3 is a perspective view of a twisted pair cable with a star or plus-shaped separator with conductors, in accordance with a first embodiment of the present invention.

FIG. 3 is a perspective view of an end of a cable 10 with a portion of a jacket 12 removed. The cable 10, in accordance with one embodiment of the present invention, is intended to replace the cable used in the patch cord 400 of FIGS. 1 and 2. The jacket 12 surrounds first, second, third and fourth twisted pairs 16, 18, 20 and 22. A plus-shaped or star-shaped separator 24 provides separation between the twisted pairs 16, 18, 20 and 22. The benefits of a separator 24 are known in the art and include such things as internal crosstalk reduction.

Figure 4:
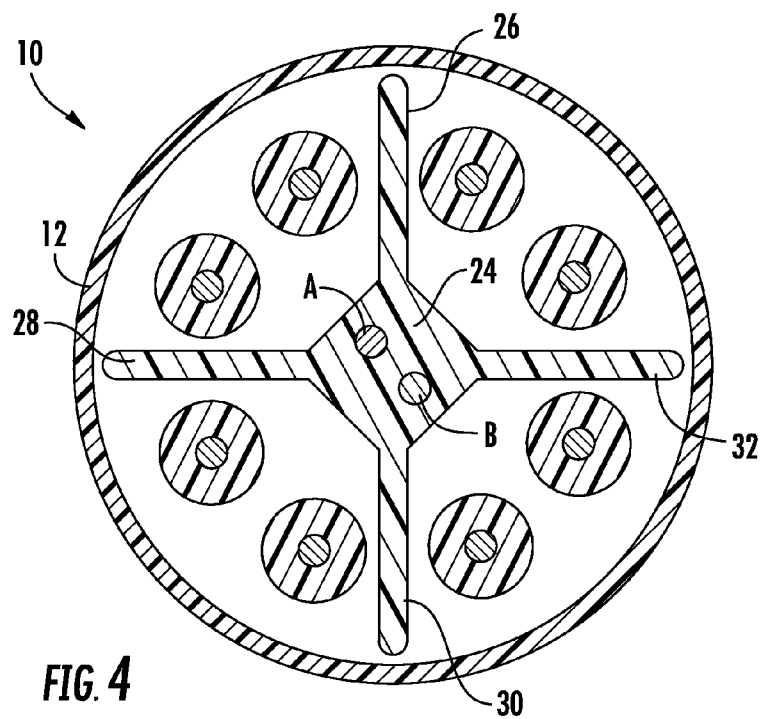
FIG. 4 is a cross sectional view taken along line IV-IV in FIG. 3.

FIG. 4 is a cross sectional view taken along line IV-IV in FIG. 3. As seen in FIGS. 3 and 4, the wires 409 and 410, amongst the twisted pairs and separator in FIG. 2, have been eliminated. The electrical connection between the pins X and X' and between the pins Y and Y' of the first and second plugs 420 and 420' in FIG. 2 is now accomplished by first and second embedded wires A and B. The embedded wires A and B may be formed of copper, copper-clad steel, aluminum, or other conductive metals or alloys.

As best seen in FIG. 4, the embedded wires A and B are within the center section of the separator 24. However, it should be appreciated that the embedded wires A and B may be located within one or more of the wings 26, 28, 30 and 32 of the separator 24. In a preferred embodiment, the embedded wires A and B each have a size of about 30 to 38 AWG, more preferably about 34 AWG.

Figure 5:
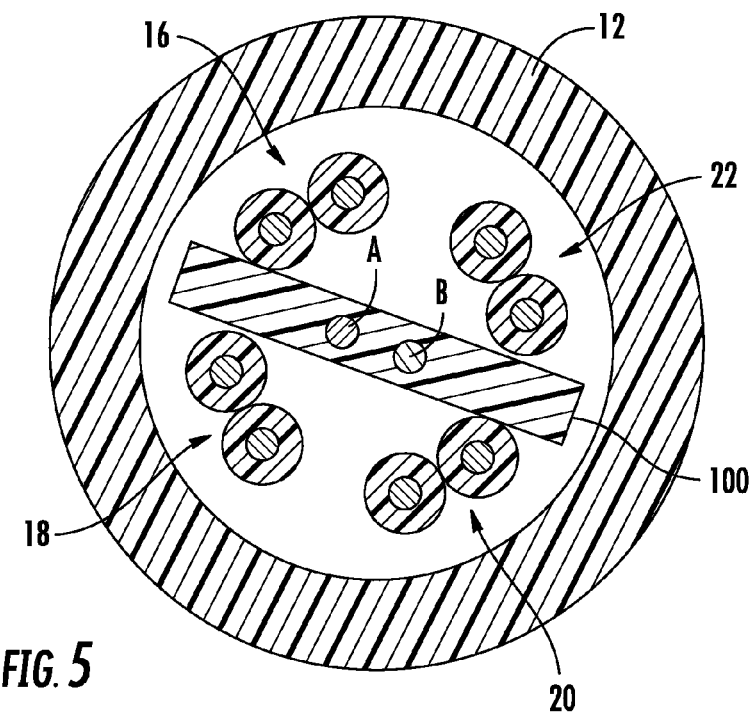
FIG. 5 is a cross sectional view of a twisted pair cable with a flat tape separator with conductors, in accordance with a second embodiment of the present invention.

FIG. 5 illustrates that the plus-shaped or star-shaped separator 24 may be replaced with a flat or tape-shaped separator 100. In a preferred embodiment, the flat, tape separator 100 is about 10 to 20 mils in thickness (e.g., separates the first and second pairs 16 and 18 by about 10 to 20 mils). More preferably, the flat, tape separator 100 has a thickness of about 15 mils. The flat separator 100 separates the first and fourth twisted pairs 16 and 22 from the second and third twisted pairs 18 and 20 and can be substituted for the plus-shaped separator (FIG. 4) in certain situations, while providing some benefits (e.g., reduced cost, reduced cable size and weight per unit length, lower smoke during a burn test).

As with the embodiment of FIGS. 3 and 4, the first embedded wire A provides an electrical connection between the first pin X of the first plug 420 and the third pin X' of the second plug 420', while the second embedded wire B provides an electrical connection between the second pin Y of the first plug 420 and the fourth pin Y' of the second plug 420'.

Figure 6:
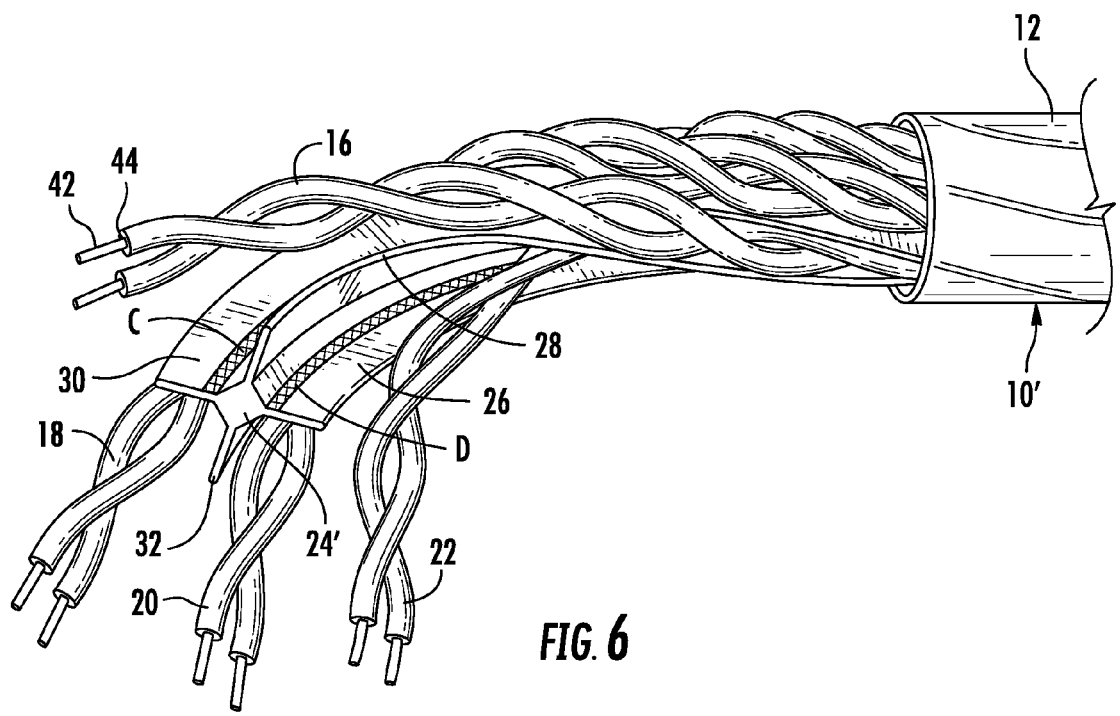
FIG. 6 is a perspective view of a twisted pair cable with a star or plus-shaped separator with conductors, in accordance with a third embodiment of the present invention.

FIG. 6 is similar to FIG. 3, but illustrates an alternative cable 10' where the embedded first and second wires A and B are replaced by first and second printed conductive wire traces C and D. As illustrated in FIG. 6, the traces C and D may be placed upon outer surfaces of wings 30 and 26 of the plus-shaped separator 24'. Because the first through fourth twisted pairs 16, 18, 20 and 22 are formed by insulated wires (e.g., insulation layer 44 over conductor 42 in the first twisted pair 16), the conductive traces may be formed by the application of a flexible conductive material sprayed onto the wings 30 and 26 of the separator 24', and such layer will not interfere with the twisted wire pairs 16, 18, 20 and 22. Of course, a non-conductive coating may be applied over the conductive traces C and D, if desired.

Figure 7:
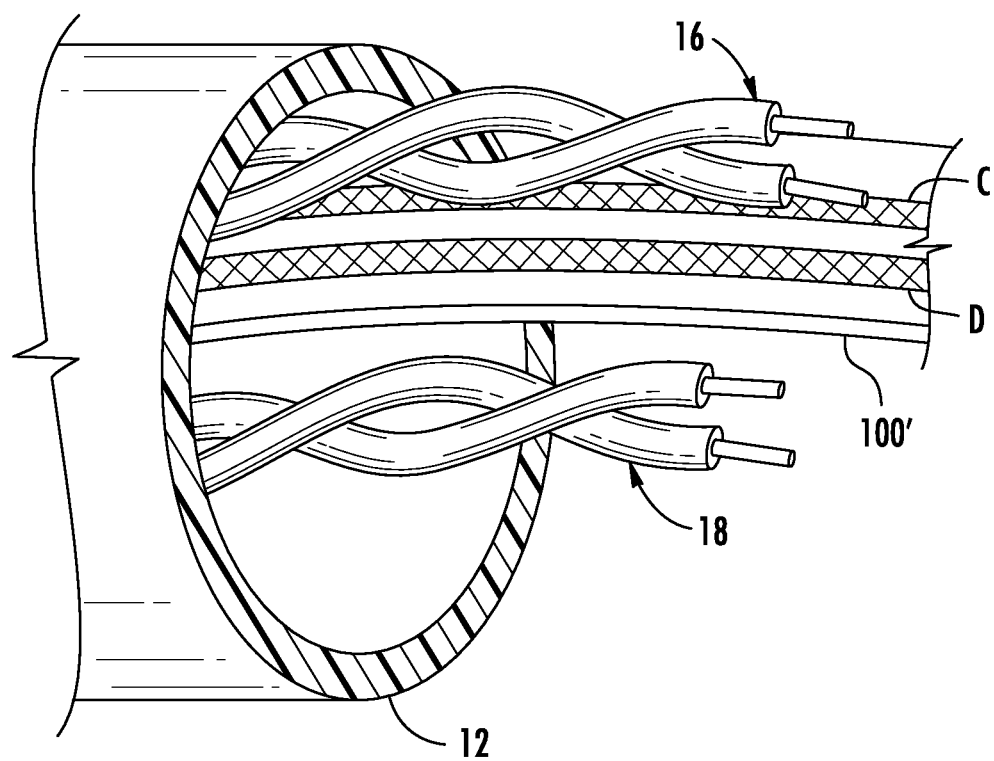
FIG. 7 is a perspective view of a twisted pair cable with a flat tape separator with conductors, in accordance with a fourth embodiment of the present invention.

FIG. 7 is a view similar to FIG. 5, but illustrates an alternative flat separator 100' where the embedded first and second wires A and B are replaced by first and second printed conductive wire traces C and D. The jacket 12 of FIG. 7 houses only first and second twisted wire pairs 16 and 18, as only two twisted pairs may be suitable in some patching situations. The traces C and D may be placed upon one surface of the flat separator 100' in a spaced apart arrangement (as illustrated), or the traces C and D may be placed upon opposing sides of the tape 100'.

Figure 8:
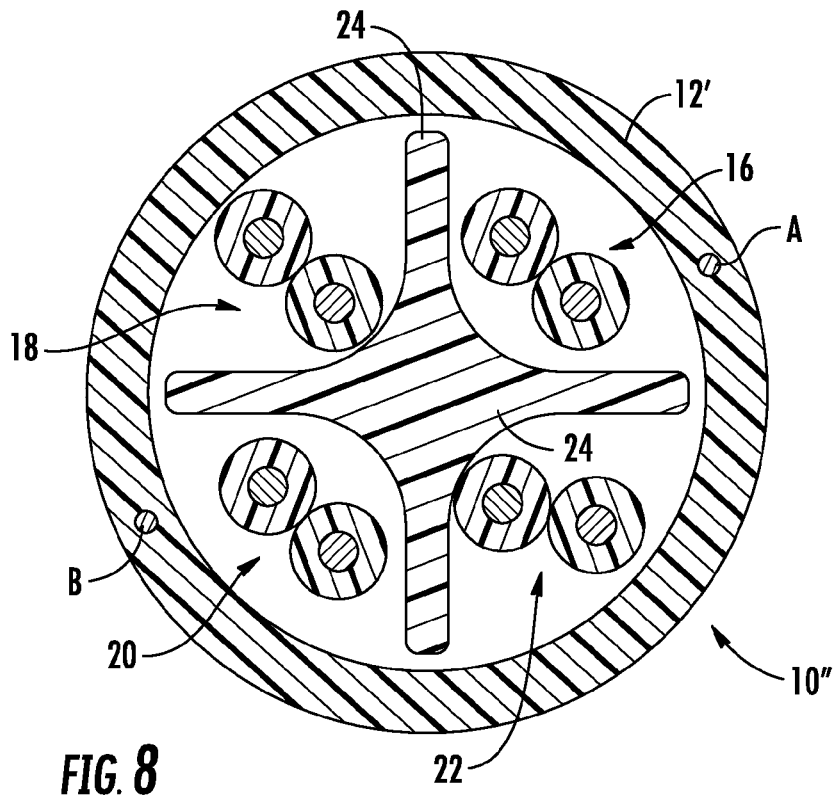
FIG. 8 is a cross sectional view of a twisted pair cable with a jacket with conductors, in accordance with a fifth embodiment of the present invention.

FIG. 8 shows a modified cable 10". The cable 10" has a core (twisted pairs 16, 18, 20 and 22 and separator 24) in accordance with a typical twisted pair cable. The jacket 12' has been modified. The jacket 12' has embedded therein, the first wire A and the second wire B.

The first and second wires A and B each have a size of about 30 to 38 AWG, more preferably about 34 AWG. The electrical connection between the pins X and X' and between the pins Y and Y' of the first and second plugs 420 and 420' is accommodated by the first and second embedded wires A and B. The embedded wires A and B may be formed of copper, copper-clad steel, aluminum, or other conductive metals or alloys.

In FIG. 8, the first wire A and the second wire B are located about 180 degrees apart in the wall of the jacket 12' to produce a mirror symmetrical cable construction, as is typical in the cabling arts. Applicants discovered that such a design performed suitably with short patch cord lengths, however with a patch cord length of 100 meters, the 10 KHz signal sent through the first wire A and the second wire B failed. No useable signal was measured at the far end of the cable 10". The failure was most likely due to a high impedance.

Figure 8P:
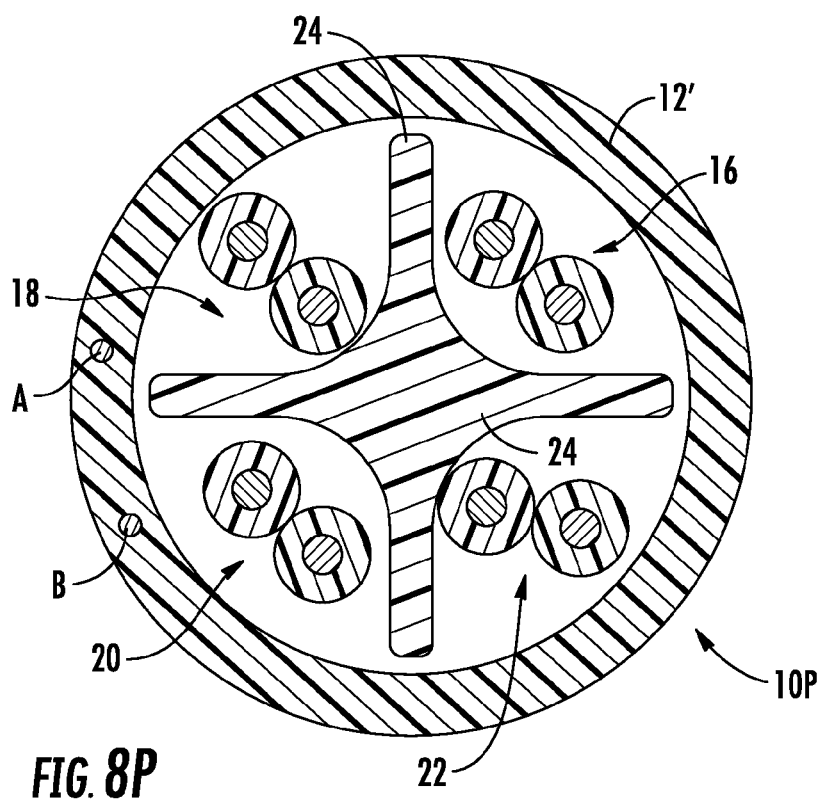
FIG. 8P is a cross sectional view of a twisted pair cable with a jacket with conductors, in accordance with a sixth embodiment of the present invention.

FIG. 8P is a cross sectional view of a preferred cable 10P. Applicants discovered that by moving the placement of the first and second wires A and B to about 30 degrees apart within the wall of the jacket 12', the 10 KHz signal could traverse the 100 meter patch cord length to permit the port-to-port mapping system to function. The first and second wires A and B were identically constructed, the only variation resided in the wire placement. Based upon these unexpected testing results, the preferred embodiment of this configuration is to have the first and second wires A and B located less than 180 degrees apart in the wall of the jacket, such as in the range of 10 to 45 degrees, more preferably in the range of 20 to 40 degrees, such as about 30 degrees apart.

Figure 9:
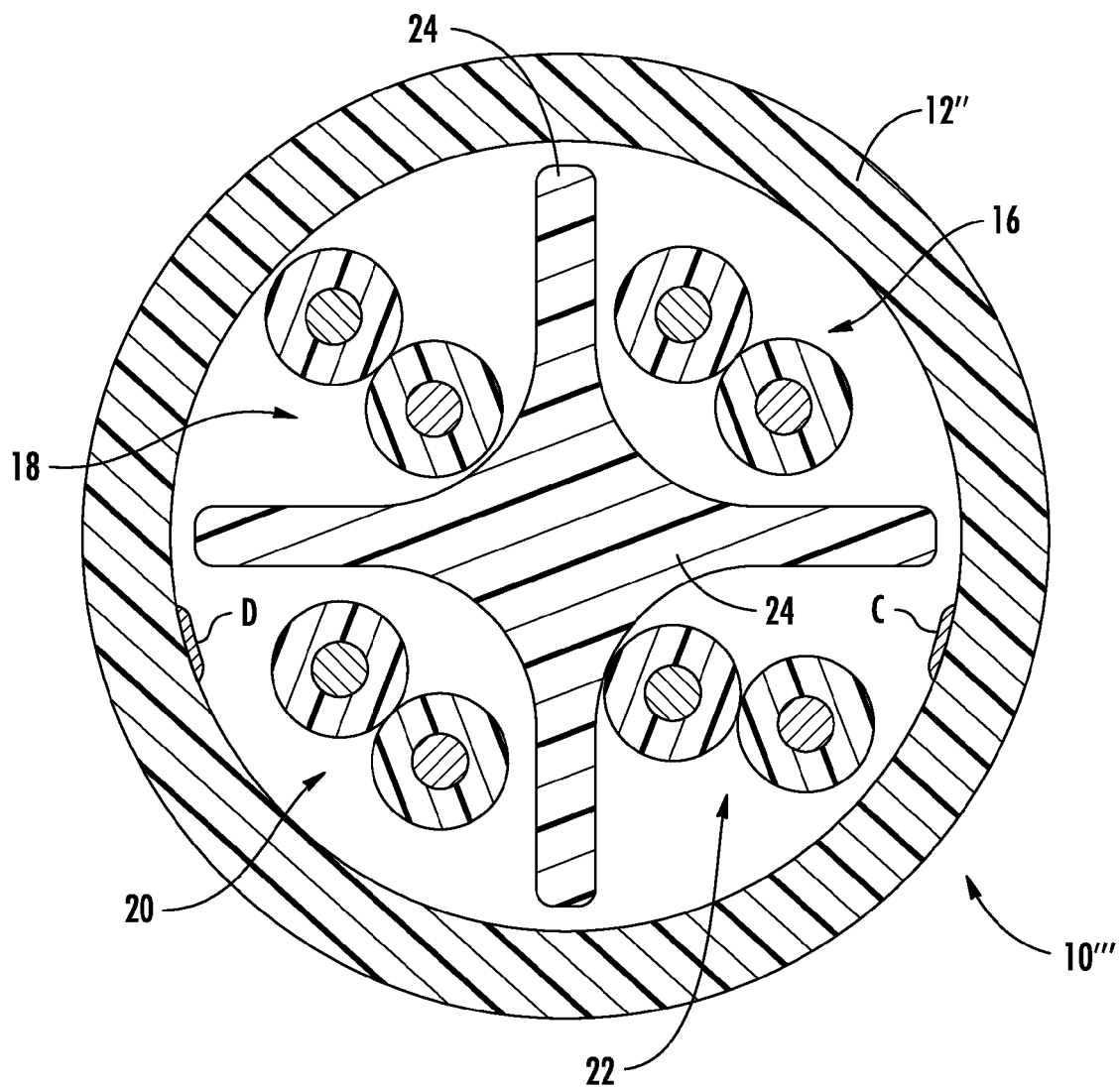
FIG. 9 is a cross sectional view of a twisted pair cable with a jacket with conductors, in accordance with a seventh embodiment of the present invention.

FIG. 9 shows a modified cable 10'". The cable 10'" has a core (twisted pairs 16, 18, 20 and 22 and separator 24) in accordance with a typical twisted pair cable. The jacket 12" has been modified. The jacket 12" has first and second printed conductive wire traces C and D on an inner radial surface thereof. The first printed conductive wire trace C provides the electrical connection between the pin X of the first plug 420 and the pin X' of the second plug 420'. The second printed conductive wire trace D provides the electrical connection between the pin Y of the first plug 420 and the pin Y' of the second plug 420'. As with FIG. 8P above, the preferred embodiment has the first and second conductive wire traces C and D located less than 180 degrees apart on the wall of the jacket. FIG. 9 shows the first and second conductive wire traces C and D approximately 150 degrees apart. However, it is believed that the preferably embodiment or best mode of the invention would have the conductive wire traces C and D located less than 150 degrees apart, such as in the range of 10 to 45 degrees, more preferably in the range of 20 to 40 degrees, such as about 30 degrees apart.

Figure 10:
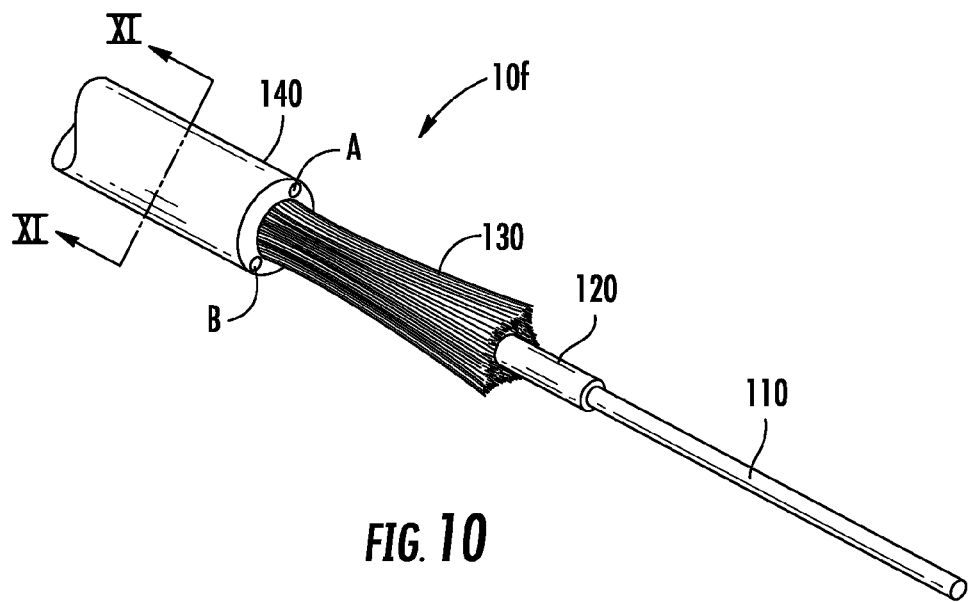
FIG. 10 is a perspective view of a fiber optic cable with a jacket with conductors, in accordance with an eighth embodiment of the present invention.
Figure 11:
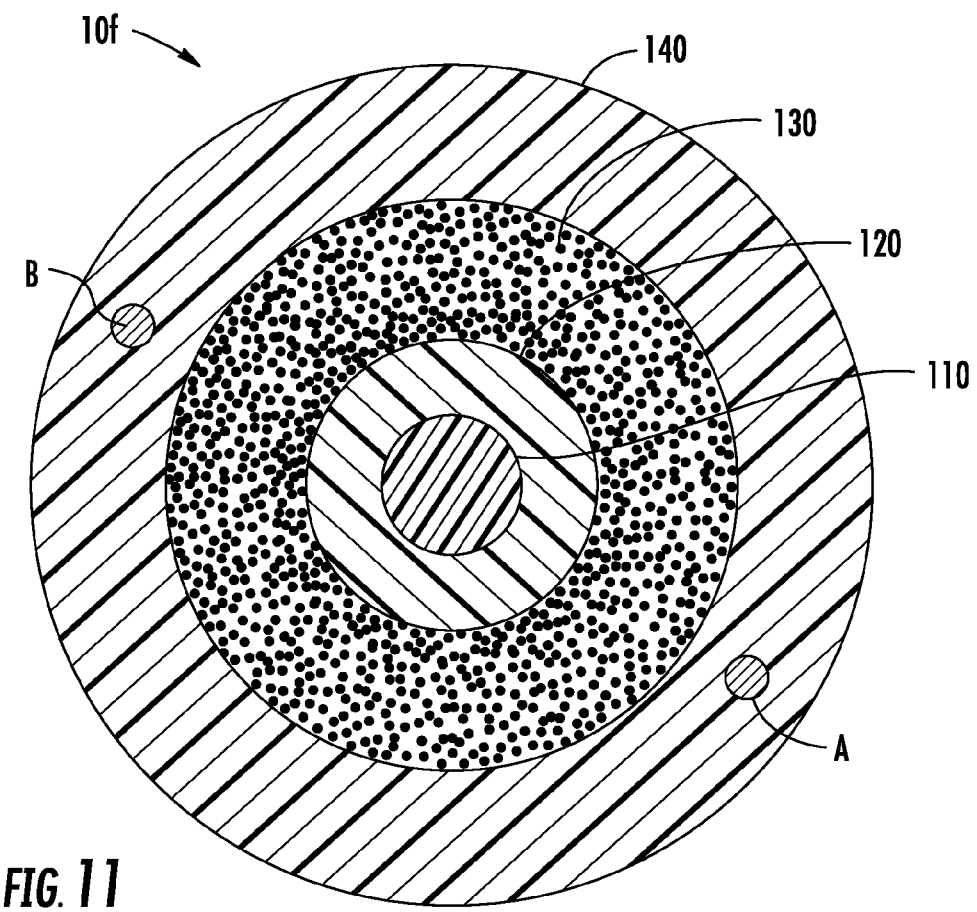
FIG. 11 is a cross sectional view taken along line XI-XI in FIG. 10.

FIGS. 10 and 11 above show a modified cable 10f. The cable 10f is a fiber optic cable having a core including a single optical fiber 110, containing a core and a cladding layer surrounding the core. The optical fiber 110 is surrounded and bonded to a coating or tight buffer layer 120. A layer of loose tensile strength members 130, such as aramid yarn, surround the tight buffer layer 120. Finally, an outer jacket 140 surrounds the strength members 130. The tight buffer layer 120 and the outer jacket 140 may be formed of polyvinyl chloride (PVC), or similar suitable materials. The outer jacket 120 has embedded therein, the first wire A and the second wire B.

The first and second wires A and B each have a size of about 30 to 38 AWG, more preferably about 34 AWG. The electrical connection between the pins X and X' and between the pins Y and Y' of the first and second plugs 420 and 420' is accommodated by the first and second embedded wires A and B. The embedded wires A and B may be formed of copper, copper-clad steel, aluminum, or other conductive metals or alloys. In a preferred embodiment, the first and second wires A and B are located less than 180 degrees apart in the wall of the jacket 140, such as in the range of 10 to 45 degrees, more preferably in the range of 20 to 40 degrees, such as about 30 degrees apart.

Figure 12:
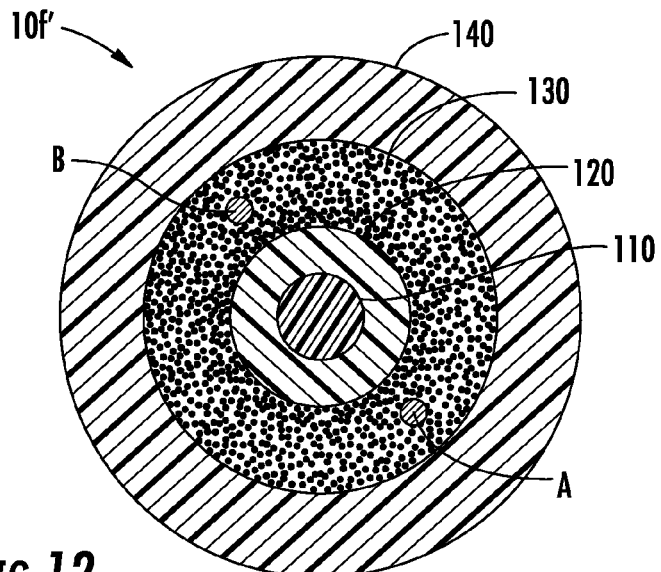
FIG. 12 is a cross sectional view of a fiber optic cable with strength members with conductors, in accordance with a ninth embodiment of the present invention.

FIG. 12 is a cross sectional view similar to FIG. 11, but illustrates a cable 10f' where the first wire A and the second wire B may be incorporated into the loose tensile strength members 130, such as aramid yarn. Other than the placement of the first wire A and the second wire B, the cable 10f' of the embodiment in FIG. 12 is the same as the cable 10f of the embodiment in FIGS. 10 and 11.

Figure 13:
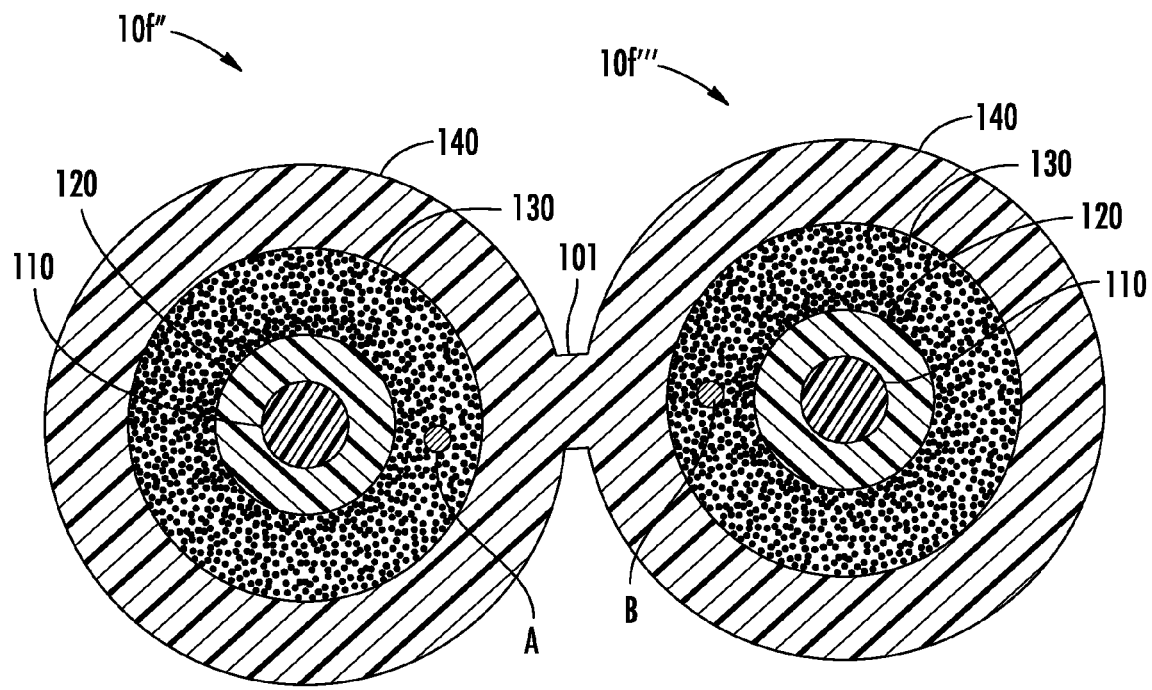
FIG. 13 is a cross sectional view of joined fiber optic cables with strength members with conductors, in accordance with a tenth embodiment of the present invention.

In the fiber patching environments, often times a duplex adapter is employed. One fiber for the duplex adapter is used for transmission, while the other fiber of the duplex adapter is used for reception. In such circumstances and as illustrated in FIG. 13, the transmission and reception fibers often have their jackets joined by a web of jacket material 101. Such a cable is known commercially as 1.6 mm Low Smoke Zero Halogen Zipcord Cable, as embodied in product N-002-ZC-5L-F16AQ, as manufactured by CommScope.

In this instance, it may be beneficial, in accordance with the present invention, to have the first wire A in the strength members 130 of one cable 10f''' and the second wire B in the strength members 130 of the other cable 10f''', as illustrated in FIG. 13.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A cable comprising:
   a separator formed of a dielectric material, dimensioned to at least separate a first twisted pair from a second twisted pair within a cable core; and
   first and second electrical conductors embedded within, and completed surrounded by, said dielectric material forming said separator.

2. The cable of claim 1, wherein said first and second electrical conductors extend continuously from proximate a first end of said separator to proximate a second end of said separator.

3. The cable of claim 1, wherein said separator is a generally star-shaped or plus-shaped member.

4. The cable of claim 1, wherein said separator is a generally flat or tape-shaped member.

5. A cable comprising:
   a separator formed of a dielectric material, dimensioned to at least separate a first twisted pair from a second twisted pair within a cable core; and
   first and second electrical conductors embedded within, or attached to an outer surface of, said separator, further comprising:
   a first plug attached to a first end of said cable; and
   first and second electrical contact pins physically attached to said first plug, wherein said first and second contact pins are electrically connected to said first and second electrical conductors.

6. The cable of claim 5, further comprising:
   a second plug attached to a second end of said cable; and
   third and fourth electrical contact pins physically attached to said second plug, wherein said third and fourth contact pins are electrically connected to said first and second electrical conductors.

7. A cable comprising:
   an outer jacket;
   first, second, third and fourth twisted pairs of insulated conductors surrounded by said outer jacket;
   a separator including a dielectric material, dimensioned to separate said first twisted pair of insulated conductors from said second twisted pair of insulated conductors along a length of said outer jacket; and
   first and second electrical conductors embedded within, or attached to an outer surface of, said separator.

8. The cable of claim 7, wherein said separator is a generally star-shaped or plus-shaped member, separate from said outer jacket.

9. The cable of claim 8,
   wherein said separator is dimensioned to separate said first twisted pair of insulated conductors from said third and fourth twisted pairs of insulated conductors along a length of said outer jacket, and said separator is dimensioned to separate said second twisted pair of insulated conductors from said third and fourth twisted pairs of insulated conductors along a length of said outer jacket, and said separator is dimensioned to separate said third twisted pair of insulated conductors from said fourth twisted pair of insulated conductors along a length of said outer jacket.

10. The cable of claim 9, wherein said first and second electrical conductors are embedded within said separator.

11. The cable of claim 10, wherein said first and second electrical conductors are embedded within a center section of said separator and each have a size of about 30 to 38 AWG.

12. The cable of claim 9, wherein said first and second electrical conductors are attached to an outer surface of said separator.

13. The cable of claim 12, wherein said first and second electrical conductors are attached on wings of said separator and formed of a flexible conductive material.

14. The cable of claim 7, wherein said separator is a generally flat or tape-shaped member, separate from said outer jacket.

15. The cable of claim 14,
   wherein said separator separates said first and third twisted pairs of insulated conductors from said second and fourth twisted pairs of insulated conductors along a length of said outer jacket.

16. The cable of claim 15, wherein said separator has a thickness of about 10 to 20 mils and wherein said first and second electrical conductors are embedded within said separator.

17. The cable of claim 15, wherein said first and second electrical conductors are attached to an outer surface of said separator.

18. The cable of claim 17, wherein said first and second electrical conductors are attached to a same surface of said separator.

* * * * *